United States Patent
Macbeth

(10) Patent No.: US 9,576,049 B2
(45) Date of Patent: Feb. 21, 2017

(54) SEMANTIC SEARCHING USING ZOOM OPERATIONS

(71) Applicant: MICROSOFT CORPORATION, Redmond, WA (US)

(72) Inventor: Steve Macbeth, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 885 days.

(21) Appl. No.: 13/723,657

(22) Filed: Dec. 21, 2012

(65) Prior Publication Data

US 2014/0181645 A1    Jun. 26, 2014

(51) Int. Cl.
| | |
|---|---|
| G06F 17/00 | (2006.01) |
| G06F 17/30 | (2006.01) |
| G06F 3/0481 | (2013.01) |
| G06F 3/0488 | (2013.01) |
| G06F 17/21 | (2006.01) |

(52) U.S. Cl.
CPC ..... *G06F 17/30716* (2013.01); *G06F 3/04815* (2013.01); *G06F 3/04883* (2013.01); *G06F 17/211* (2013.01); *G06F 2203/04806* (2013.01)

(58) Field of Classification Search
CPC .......................... G06F 17/211; G06F 17/30569
USPC .......................... 715/200, 243, 249, 273, 276
See application file for complete search history.

(56) References Cited

U.S. PATENT DOCUMENTS

| | | | |
|---|---|---|---|
| 7,552,398 B2 | 6/2009 | Bier et al. | |
| 8,957,920 B2 * | 2/2015 | Giambalvo et al. | 345/660 |
| 2008/0122796 A1 * | 5/2008 | Jobs et al. | 345/173 |
| 2010/0044121 A1 * | 2/2010 | Simon et al. | 178/18.03 |
| 2011/0316884 A1 * | 12/2011 | Giambalvo et al. | 345/660 |
| 2012/0197857 A1 | 8/2012 | Huang et al. | |
| 2013/0055077 A1 * | 2/2013 | Hagel-Sorensen | 715/273 |
| 2013/0117658 A1 * | 5/2013 | Fidler et al. | 715/234 |
| 2013/0176344 A1 * | 7/2013 | Mandic et al. | 345/661 |
| 2013/0212486 A1 * | 8/2013 | Joshi et al. | 715/744 |

(Continued)

OTHER PUBLICATIONS

International Preliminary Report on Patentability dated Mar. 25, 2015 in Application No. PCT/US2013/076513, 17 pages.

(Continued)

*Primary Examiner* — Stephen Hong
*Assistant Examiner* — Gregory J Vaughn
(74) *Attorney, Agent, or Firm* — Dave Ream; Tom Wong; Micky Minhas

(57) ABSTRACT

Computer storage media, computerized methods, and systems for semantically navigating between content using zoom operations, as well as other user-initiated operations, are provided. The zoom operations include an open-pinch gesture (zoom in) and a closed-pinch gesture (zoom out) physically applied to a touch-screen display of a client device, where the touch-screen display presents a document with original content. When one or more of the zoom operations have been detected as being performed upon a targeted portion of the original content, new content that is relevant to the targeted content is retrieved, as opposed to simply expanding or contracting the original content within a display area of the touch-screen display. The document is transitioned to a view with representations of the new content organized according to a format, where the format is dictated by a type of the one or more zoom operations being performed.

20 Claims, 10 Drawing Sheets

(56) References Cited

U.S. PATENT DOCUMENTS

2013/0293572 A1* 11/2013 Kodimer et al. ............. 345/629
2014/0176690 A1*  6/2014 Hamel et al. ................... 348/63
2015/0124000 A1*  5/2015 Giambalvo et al. .......... 345/661

OTHER PUBLICATIONS

Jetter, et al., "Does (Multi-) Touch Aid Users' Spatial Memory and Navigation in 'Panning' and in 'Zooming & Panning' UIs?", In Proceedings of International Working Conference on Advanced Visual Interfaces, May 21, 2012, 8 pages.
Rennison, Earl, "Galaxy of News an Approach to Visualizing and Understanding Expansive News Landscapes", In Proceedings of the 7th Annual ACM Symposium on User Interface Software and Technology, Nov. 2, 1994, 10 pages.
Dork, et al., "Fluid Views: A Zoomable Search Environment", In Proceedings of International Working Conference on Advanced Visual Interfaces, May 21, 2012, 8 pages.
International Search Report & Written Opinion for PCT Patent Application No. PCT/US2013/076513, Mailed Date: Aug. 22, 2014, 8 Pages.

* cited by examiner

SEMANTIC SEARCHING USING ZOOM OPERATIONS

BACKGROUND

Documents within search results are largely disconnected from each other from a semantic point of view. For instance, if a user desires to understand more about a particular web document with respect to an intent behind a search query, the user is forced to leave the web document and return to a search-engine results page (SERP) or submit a new search query. By leaving the web document, the user is required to personally carry the context of the web document for later entry within the new search query or when reviewing the listing of documents within the SERP. For example, the context about the document may be author, where the user wants to discover other documents written by the same author of the web document being viewed. In order to identify these other documents, the user must determine the author of the web document, commit a mane of the author to memory, leave the web document, enter the name of the author within a follow-up search query, and review the search results that are returned in response to the follow-up search query to discover the sought-after documents.

Further, when a user wants to view documents that are returned in association with a search query, the user is forced to take a number of actions to navigate from one document to the next: click a link to open the first document, click a go-back button, and click a link to open a second document. These actions, when performed numerous times for numerous search sessions, can be time-consuming and provide a frustrating user experience. Accordingly, a new functionality for navigating between the selected document and other search results and/or other documents would introduce an efficient way to review multiple documents, or other relevant information, without conducting a rigid succession of clicks.

Accordingly, this efficient way for navigating between documents, as introduced by embodiments of the present invention, involve a semantic zoom-based functionality for organizing content relevant to a document, thereby enhance a user's searching experience. This zoom-based approach may transform multi-page websites into a single infinite canvas that allows a user to fluidly access sought-after content and/or areas of interest without the delays inherent with clicking through a predefined organization of web pages.

SUMMARY

This summary introduces simplified concepts of gesture-based searching, which is further described below in the Detailed Description. This summary is not intended to identify essential features of the claimed subject matter, nor is it intended for use in limiting the scope of the claimed subject matter.

This application describes example embodiments for using zoom operations (e.g., open-pinch gesture and close-pinch gesture physically performed on a touch-screen display), as well as other user-initiated actions (e.g., panning operations and twisting operations), to navigate from original content within a document to new content populated within a view. The new content may be organized according to a format, where the format of the view may be selected according to a type of the user-initiated action being carried out by the user. In this way, this semantic zoom-based functionality enables navigation between content relevant to the user's searching intent because the mechanisms/engines underlying this functionality actively consider the context of the user's searching intent when selecting new content. As such, the zoom operations are employed to invoke the semantic zoom-based functionality, as opposed to simply expanding or contracting the original content of the document within an area of the touch-screen display.

In one example of the semantic zoom-based functionality, the user may be interacting within a web document that is surfaced upon entering a search query for the "Higgs Boson." Initially, this web document is arrived upon by the user receiving a set of a search results within a search-engine results page (SERP) and selecting a link associated within one of the search results. One of the interactions performed upon the web document may be a user-initiated zoom-out operation (e.g., zooms out beyond 100% of a size of a page of the web document). In response to the zoom-out operation, broad-scope content that provides context about the document may be retrieved.

This broad-scope content may be of various types, gathered from various sources (e.g., paid vendors, private sites, social networks), organized according to a format that is intuitive with respect to the zoom-out operation being performed, and presented within a generalized view. Examples of the broad-scope content may be objects that reveal physics materials that explain the Higgs Boson or a definition of the Higgs Boson pulled from the Wikipedia site. Thus, instead of clicking back to the SERP and reading the additional search results to understand basic information about the Higgs Boson, the zoom-in operation allows the user to quickly and easily access a wealth of information (e.g., people, places, topics, events mentioned on the web document, other queries that lead to the web document, popular sites associated with the web document, social media related to the web document, and actions that can be taken on the web document) surrounding a general context of the web document.

Another of the interactions performed upon the web document may be a user-initiated zoom-in operation (e.g., zooms in to a word, phrase, paragraph, or passage within the web document). In response to the zoom-in operation, a portion of original content within the document that is a target of the zoom-in operation is identified. Specific content related to the target content may be retrieved and a focused view that is associated with a first format may be rendered. Typically, the focused view includes one or more representations of the specific content organized according to the first format, as opposed to simply expanding the original content within a display area.

The specific content may include detailed information about the target content. This specific content may be of various types, gathered from various sources (e.g., paid vendors, private sites, social networks, and the like), organized according to a format that is intuitive with respect to the zoom-in operation being performed, and presented within the focused view. Examples of the specific content may be objects that expose additional documents and information surrounding concepts (e.g., Hadron Collider), or entities (e.g., person, place, or thing) within the target content. Once these objects are exposed, the user may drill down further by using the zoom-in operation again. For example, the user may direct a zoom-in operation toward a concept of "Hadron Collider" to see specific content related thereto, such as the city of Cern, a list of researchers, ongoing projects, notable scientists, and other material that describes aspects of the context of Hadron Collider in greater detail.

Thus, embodiments of the present invention provide a zoomable interface, where the user is allowed to zoom in for details on a portion of content or zoom out for big-picture context about a document or concept, thereby rendering the page as a single infinite canvas of data. This zoomable interface allows a user to interact with the web as a multi-dimensional space where details/context surrounding content may be expanded and contracted, as opposed to simply physically expanding or contracting the document itself using conventional zooming.

Further, the zoomable interface may be customized by the user, document publisher, system administrator, or other party using configuration settings. These configuration setting may help restrict the type of content being served in response to a zoom operation. For example, configuration settings may be selected by a user that add context to zoom operations that limit the content retrieved to the entities of people and places. In one instance, the selection of certain configuration settings may be made through a browser application by pinning one or more entities to a document (e.g., using control buttons on a toolbar). These pinned entities affect the type of content delivered to the user upon the user performing zoom operations upon the document.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates substantially similar or identical items.

DETAILED DESCRIPTION

Figure 1:
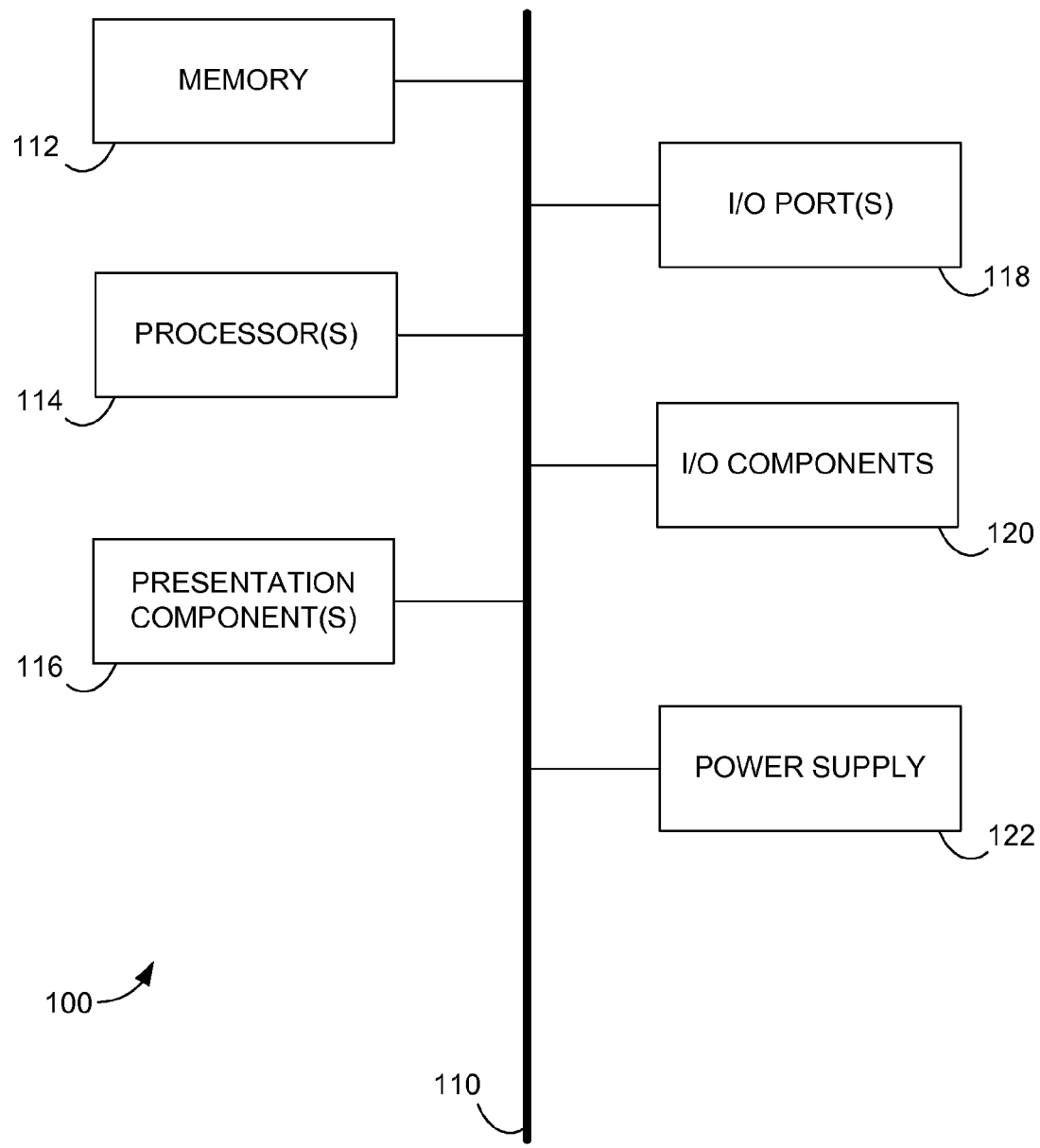
FIG. 1 is a block diagram of an exemplary computing environment suitable for use in implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention provide systems, media, and computerized methods for inserting online content within editable content of a document being composed and/or manipulated via a document-authoring application without leaving the document-authoring application.

In embodiments of the present invention, a semantic zoom-based functionality for searching is introduced that allows for interaction with a user via simple and intuitive gestures, such as "zoom-in" and "zoom-out" operations. These zoom operations of the semantic zoom-based functionality may trigger actions that surface more varied results, as explained below, as opposed to simply visually expanding or contracting a document within display area (e.g., browse view of a window).

In one instance, new actions are established that occur in response to current or new touch gestures (e.g., used in conjunction with the Metro-style search interface), where these new actions are part of the semantic zoom-based functionality. In one example, the touch gestures may include an open-pinch gesture (zoom-in operation). In operation, the open-pinch gesture on a link with a document may invoke a semantic zoom that collects and presents a first set of content related to a search context surrounding the link. Differently, a twisted pinch on the link may invoke a customized zoom that collects and presents a second set of content (e.g., limited to a user's predefined search preferences associated with the link, the document, or the zoom interface). In another example, the touch gestures may include a close-pinch gesture (zoom-in operation). In operation, the close-pinch gesture on a link with a document may invoke a semantic zoom that collects and presents a third set of content with detailed information about the link itself, such as the web page to which the link is directed.

In addition to pairing the new or current touch gestures with innovative search actions, the semantic zoom-based functionality may establish interface-specific standards for navigating consistently, predictably, and accurately. In one embodiment, the standards may involve mapping a particular format of a view of rendered content with a particular zoom operation. For instance, the format of the content gathered and displayed within a focus view, which is rendered upon performing an open-pinch gesture on some portion of original content within a document, may remain consistent regardless of the different types of content that are retrieved. In another embodiment, the standards may involve mapping a certain type of content, which is retrieved in response to a zoom operation, to a type of document receiving the zoom operation. For instance, for a Word document, the type of content being retrieved in response to a close-pinch gesture will remain consistent regardless of the portion of original content within the Word document in which the close-pinch gesture is performed.

In other embodiments of the present invention, visual cues are provided to indicate a transition from the document currently being viewed to the various views of retrieved content that are presented in response to one or more zoom operations. These visual cues help educate the user that the semantic zoom-based functionality is being employed by a search interface. In one instance, the visual cues may expand or contract text before replacing the text with a view of retrieved content. In another instance, the visual cues may show a preview of the retrieved content that will be presented upon completing the one or more zoom operation (e.g., before lifting fingers from a touch-screen display when conducting a pinch-type gesture).

In still other embodiments of the present invention, configuration settings are provided that assist in modifying the context in which the semantic zoom-based functionality is carried out. The configuration settings may be specified or altered by making available options that are selectable by a user, publisher of a document (e.g., owner of a website), administrator of a system (e.g., provider of a search service), or another party (e.g., third-party vendor of a search service or ad service). In one instance, the options selected within the configuration settings may control, in part, a type of retrieved content that is rendered upon completing a zoom operation. In one example, a publisher of a document may select an option within the configuration settings that specifically imports certain information (e.g., social-media commentary, most-popular related documents, or common queries to the document) within the retrieved content in response to a zoom operation on the document. In another example, a user may select an option within the configuration settings by pinning particular entities (e.g., people, places, topics, things, and events) to their browser application, such that retrieved content is relevant to the particular entities in which the user is mainly interested.

As used herein, the term "entity" generally refers to logical objects that may be represented by a particular online description. These logical objects may be a person, place, thing, or any combination thereof. For instance, some examples of logical objects are the following: the movie Avatar; the restaurant Shiva's; the CEO of Microsoft; the Alaska Airlines' flight #AS331; and the Canon PowerShot digital camera. Accordingly, technology introduced by embodiments of the present invention allows for automatically distilling a concept from original content within a document. Generally, this technology helps disambiguate a user's true searching intent when performing a zoom operation on a portion of a document. In this way, upon comparing the targeted portion of the document against one or more predefined entities of interest, those entities may be used to glean the user's overall, pending intent for a search in a way that is sufficiently transparent to the user.

In one aspect of the present invention, a method is performed by exiting computer-executable instructions embodied on one or more computer storage media. Generally, the method involves steps for semantically navigating between content using zoom operations. In embodiments, the steps of the method involve receiving an indication that a zoom-in operation is performed on a page of a document.

In one instance, the zoom-in operation represents an open-pinch gesture carried out on a touch-screen display of a client device.

In response to the zoom-in operation, a portion of original content within the document that is a target of the zoom-in operation is identified and specific content that includes detailed information about the target content is retrieved. Upon retrieving the specific content, a focused view that is associated with a first format is rendered. Typically, the focused view includes one or more representations of the specific content organized according to the first format, as opposed to expanding the original content within a display area. The focused view may be presented within the display area of a client device, thereby allowing the user to review the specific content. At times, the method further comprises displaying visual cues to indicate a transition between the original content of the document and the specific content of the focused view.

The steps of the method may further include receiving an indication that a zoom-out operation is performed on the page of the document. In one instance, the zoom-out operation represents an close-pinch gesture carried out on a touch-screen display of a client device. In response to the zoom-out operation, broad-scope content that provides context about the document is retrieved and a generalized view that is associated with a second format is rendered. Typically, the generalized view includes one or more representations of the broad-scope content organized according to the second format, as opposed to contracting the original content within a display area. The generalized view may be presented within the display area of the client device, thereby allowing the user to review the broad-scope content. At times, the method further comprises displaying visual cues to indicate a transition between the original content of the document and the broad-scope content of the general view. It should be noted that the first format and the second format may be governed by a type of the document and/or a type of zoom operation performed on the document.

In another aspect of the present invention, a computerized method is performed for transitioning a page of a document to a first view or a second view in accordance with semantic zoom-based functionality. In embodiments, the method involves a step of detecting a first user-initiated action applied to a touch-screen display of a client device. Typically, a portion of original content within the document is a target of the first user-initiated operation. Upon detecting the first user-initiated operation, the page of the document is automatically transitioned to the first view. Typically, the first view includes a first set of content related to the target content, where the first set of content is organized according to a first format that is associated with the first user-initiated operation. In embodiments, a type of content of the first set of content is specified by configuration settings controlled by a user of the client device or a publisher of the document. The first view may be presented to the user on the touch-screen display.

In another embodiment, the method may include detecting a second user-initiated operation applied to a touch-screen display of a client device. In response to the second user-initiated operation, the page of the document is automatically transitioned to the second view. Typically, the second view includes a second set of content related to an aggregation of the original content of the page of the document, where the second set of content is organized according to a second format that is associated with the second user-initiated operation. In embodiments, a type of content of the second set of content is specified by the configuration settings. The second view may be presented to the user on the touch-screen display.

The user-initiated operations may be any type of action, such as a gesture physically performed by a user upon a touch-screen display of a client device (e.g., tablet computer). In one example, the first user-initiated operation represents a open-pinch gesture and the second user-initiated operation represents a close-pinch gesture. In another example, the first user-initiated operation represents a pan-forward gesture and the second user-initiated operation represents a pan-backward gesture. In still another example, first user-initiated operation represents a right-twist gesture and the second user-initiated operation represents a left-twist gesture.

In other aspects of the present invention, a computer system is provided for navigating between semantically related content in response to zoom operations within a document. Generally, the computer system includes a processing unit coupled to a computer storage medium that stores a plurality of computer software components executable by the processing unit. The computer software components include a semantic engine, a ranking mechanism, and a conversion mechanism. The semantic engine is configured for detecting at least one zoom operation directed to a portion of original content within the document. Also, the semantic engine may be configured for transitioning from the document to a view that includes a new set of content that is linked to the original content via tendrils in a predefined directed graph. As used herein, the phrase "directed graph" is meant to represent an architecture constructed of a multidimensional lattice of semantic connections between nodes, where the nodes include the original content and the new set of content.

In embodiments, the ranking mechanism is configured for filtering content retrieved from one or more vendor modules to the new set of content and for ordering the new set of content based on, in part, relevance to the original content. The conversion mechanism is configured for determining a format of the view based on, in part, a type of the at least one zoom operation. Also, the conversion mechanism may be configured for organizing the new set of content in accordance within the format.

Multiple and varied implementations and embodiments are described below. The following section describes an example environment that is suitable for implementing embodiments of the present invention. The following sections describe illustrative aspects of the techniques for carrying out embodiments of the present invention.

Having briefly described an overview of embodiments of the present invention, an exemplary operating environment suitable for implementing the present invention is described below.

Referring to the drawings in general, and initially to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components/modules illustrated.

The invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The invention may be practiced in a variety of system configurations, including hand-held devices, consumer electronics, general-purpose computers, specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media.

Computer storage media includes volatile and non-volatile, removable and nonremovable media implemented in any method or technology for storage of information such as computer readable instructions, data structures, program modules, or other data. Computer storage media include, but are not limited to, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media typically embody computer-readable instructions, data structures, program modules, or other data in a modulated data signal, such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above should also be included within the scope of computer-readable media; however, as defined herein, computer storage media does not include communication media.

Memory 112 includes computer-storage media in the form of volatile and/or nonvolatile memory. The memory may be removable, nonremovable, or a combination thereof. Exemplary hardware devices include solid-state memory, hard drives, optical-disk drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
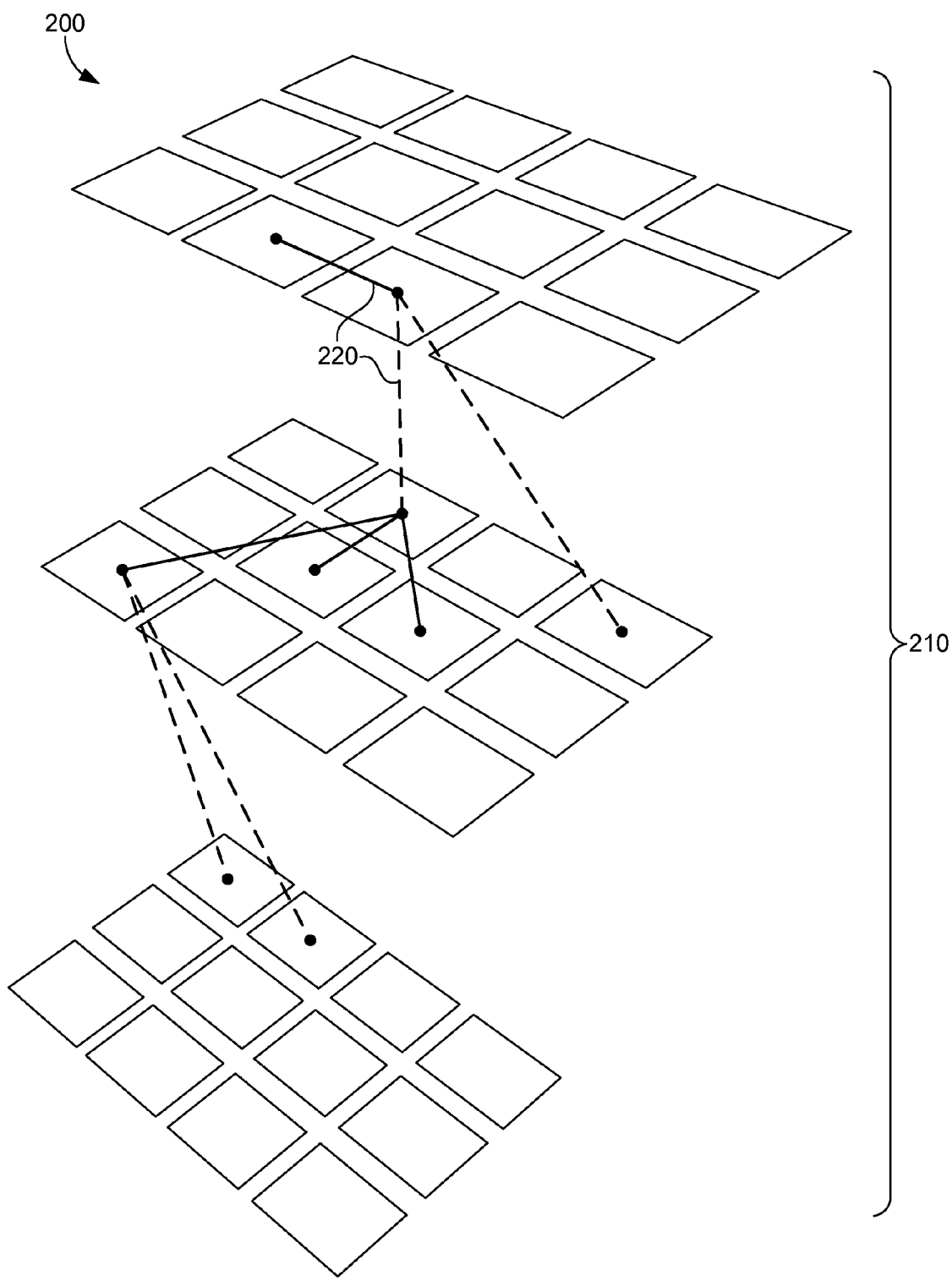
FIG. 2 is an illustrative structural diagram of a directed graph of exemplary semantic connections that link relevant content in a semantic manner, in accordance with embodiments of the present invention.

Turning now to FIG. 2, an illustrative structural diagram of a directed graph 200 of exemplary semantic connections 220 that link relevant content in a semantic manner is shown, in accordance with embodiments of the present invention. As used herein, the directed graph generally represents a multidimensional lattice, as opposed to a fixed hierarchy, structured with semantic connections 220 that link content within documents 210. In one instance, the content is linked in accordance with attributes that appear within the documents 210. The content currently being viewed by a user (e.g., search-results page or other online document) is designated as the root of the directed graph 200. Once a transition is made in response to a user-initiated operation applied to the currently viewed content, the new content retrieved is designated as the root of the directed graph.

The directed graph may be conceptualized as a framework that links documents 210 together in a semantic manner. For example, targeted content within a document being viewed (root) may be linked to a first set of content within a similar type of document and a second set of content within a dissimilar type of document via tendrils in the directed graph 200. In this example, the directed graph 200 is constructed of a multi-dimensional lattice of semantic connections 220 between nodes, where the nodes include the original content, first set of content, and second set of content.

The directed graph 200 is distinct from a hierarchical connection between a focus of the zoom operation and a set of results because the hierarchical connection represents a single-dimensional approach for conducting searches. That is, hierarchical connections constitute a rigid, linear, search implementation that is inflexible between the material being drawn in response to an action. For instance, within hierarchical connections, a page-back command from an online document would render a search-results page that has a link to the online document. In contrast, a zoom-out operation on the same online document would gather and reveal relevant information specifically directed to the content within the online document. Thus, within a fixed structure of the hierarchical connections, the links between content is unidirectional in nature (top and bottom). In embodiments, the directed graph 200 is generated by a relationship construction engine that automatically establishes semantic connections between related articles, for example. However, it should be noted that documents 210 may be linked in real-time based on online content extracted from one or more websites without the need for a formalized framework to be set in place.

In operation of the directed graph 200, a user may start on a node (e.g., concept, paragraph, document, entity, word, sub-part of a document, class of documents) within the directed graph 200. The user's subsequent operations (e.g., panning and zooming) upon the node cause the engine to navigate across semantic connections 220 from the node by some semantic meaning to another node or group of nodes. Because these nodes are connected by the semantic connections 220, there is a high probabilistic nature that the content on the nodes linked to the starting node add value to the features within the starting node.

Further, as discussed more fully below, for every type of node (e.g., class of object), there may be a prescribed transition associated with the operations performed by a user, thereby creating similar behavior that is predictable and expected by a user when moving between nodes on the directed graph 200, or documents 210 within a UI. For example, a zoom-in operation performed on a page of a Word document may consistently expose a paragraph that is the target of the zoom-in operation and, possibly, additional materials related to content of the paragraph within the semantic space of the directed graph 200. Accordingly, this predictability between a format of a view that is produced in response to a type of document being addressed and/or a type of operation being carried out by the user on the document lends to the user's understanding of the semantic zoom-based functionality. Further, the zoom operations discussed herein, as opposed to the variability in conventional zooming, are binary in form. That is, zoom operations produce a particular result (e.g., format of a view with certain content populated therein) regardless of how much the user has zoomed in on a touch-screen display.

For example, a zoom-in operation on a name within a document may always expose an overview of the person(s) associated with the name. Meanwhile, in the same example, a zoom-out operation on the name shows the person(s)' connections to a broader network or groups, regardless of how small or large the gesture was made by the user. In this way, embodiments of the present invention provide a deterministic architecture with preestablished and consistent navigations based on, in part, the type of operation and/or the type of document. The deterministic architecture ensures that the type of information being revealed, as well as what is being hidden, promotes a consistent search experience for the user. For example, certain classes of entities (products vs. service), upon being targeted by a user operation, would have different rules within the deterministic architecture. At times, the deterministic architecture relies on templates that dictate the composition of a view being transitioned to (from original content within a document) in terms of both form and content. It should be noted that embodiments of the present invention may also encompass a non-deterministic architecture that allows for real-time searching for content within the directed graph 200 to in response to a user-initiated operation.

Figure 3:
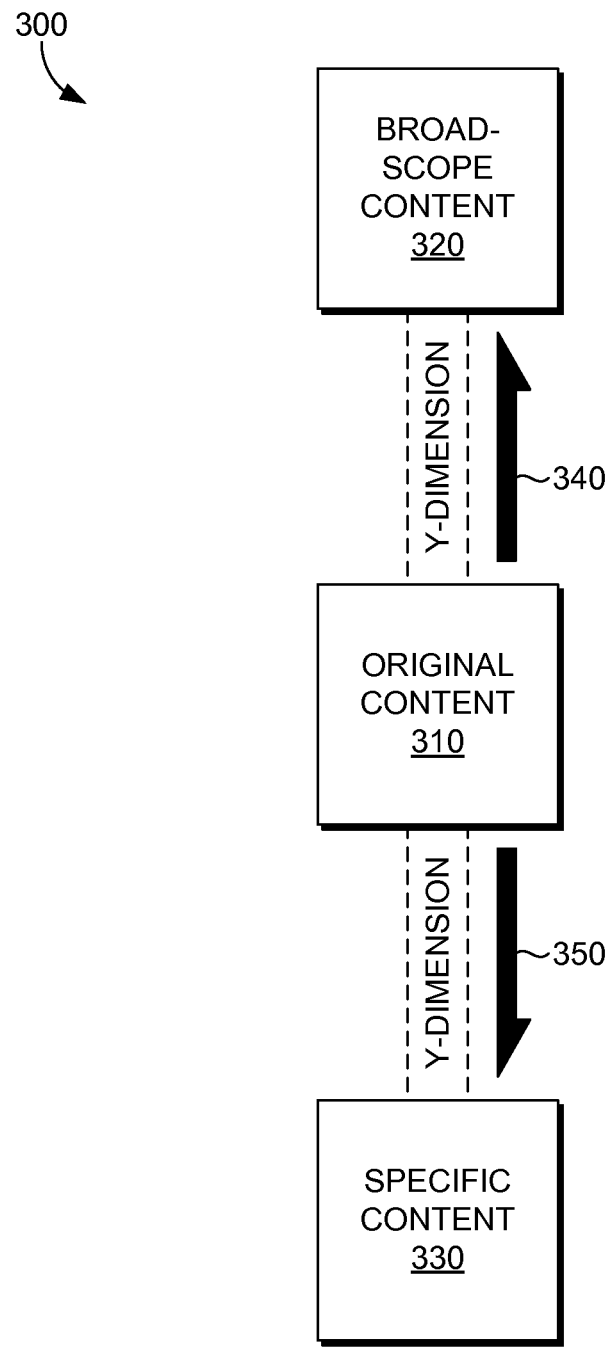
FIG. 3 is block diagram of exemplary transitions between a document and views of retrieved content within a y-dimension of the directed graph, in accordance with embodiments of the present invention.

With reference to FIG. 3, a block diagram of exemplary transitions 300 between a document and views of retrieved content within a y-dimension of the directed graph are shown, in accordance with embodiments of the present invention. Generally, in embodiments of the present invention, zooming operations are associated with the y-dimension of the directed graph. These zooming operations allow a user to see a more general view about original content targeted within a document (zoom out) or a more specific view (zoom in). Thus, zooming operations allow for linking the content of documents via semantic connections, as opposed to simply expanding the original content within a display area. The semantic connections may link original content 310 to other content (e.g., broad-scope content 320 or specific content 330) by some form of context (e.g., author, topic, supporting materials of the document, or web pages in which the document is cited). Please note that the terms "document," "web page" and "view" are used interchangeably herein and all generally refer to some container to hold and expose content to a user.

Figure 4:
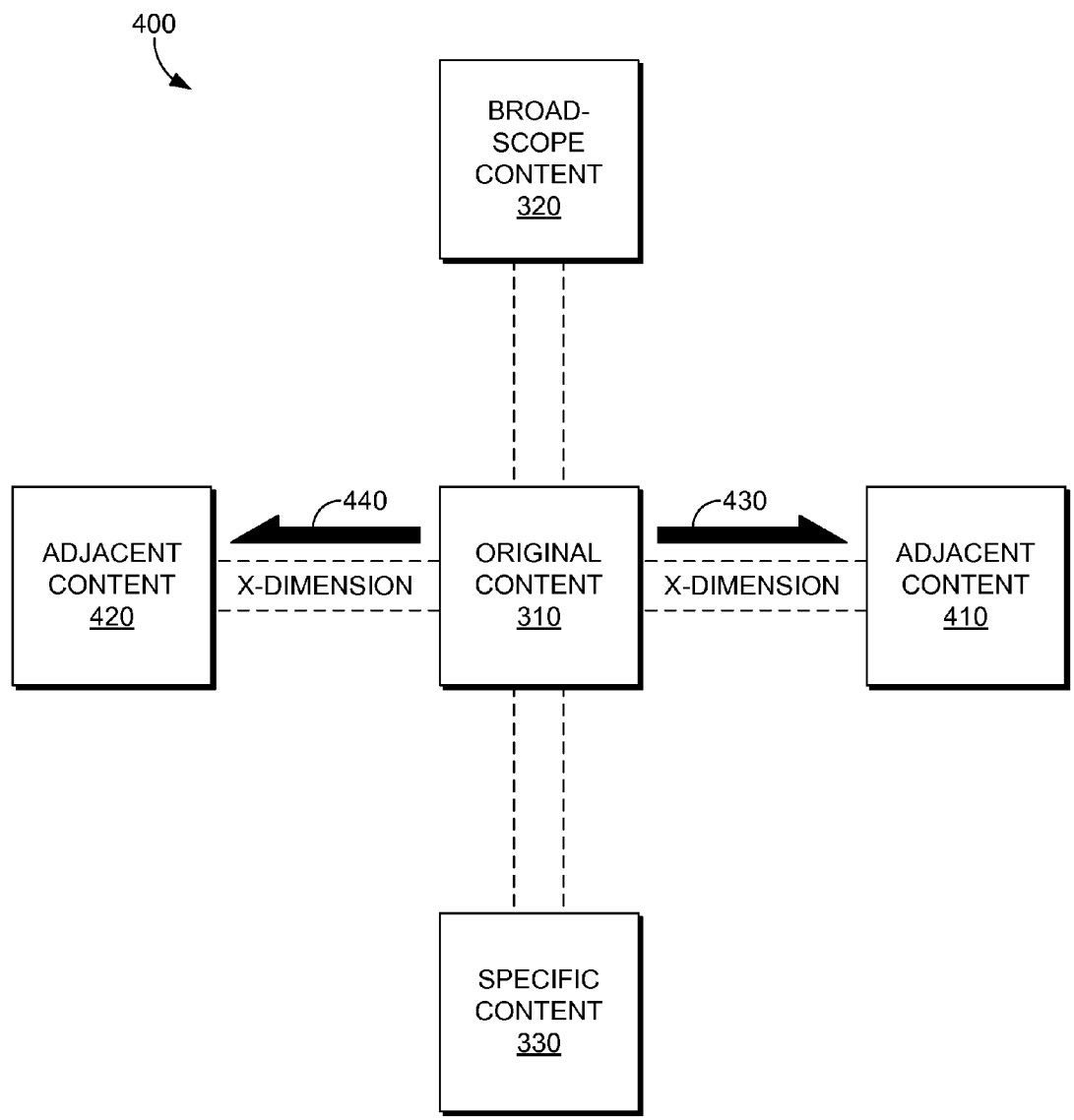
FIG. 4 is block diagram of exemplary transitions between a document and views of retrieved content within an x-dimension of the directed graph, in accordance with embodiments of the present invention.
Figure 5:
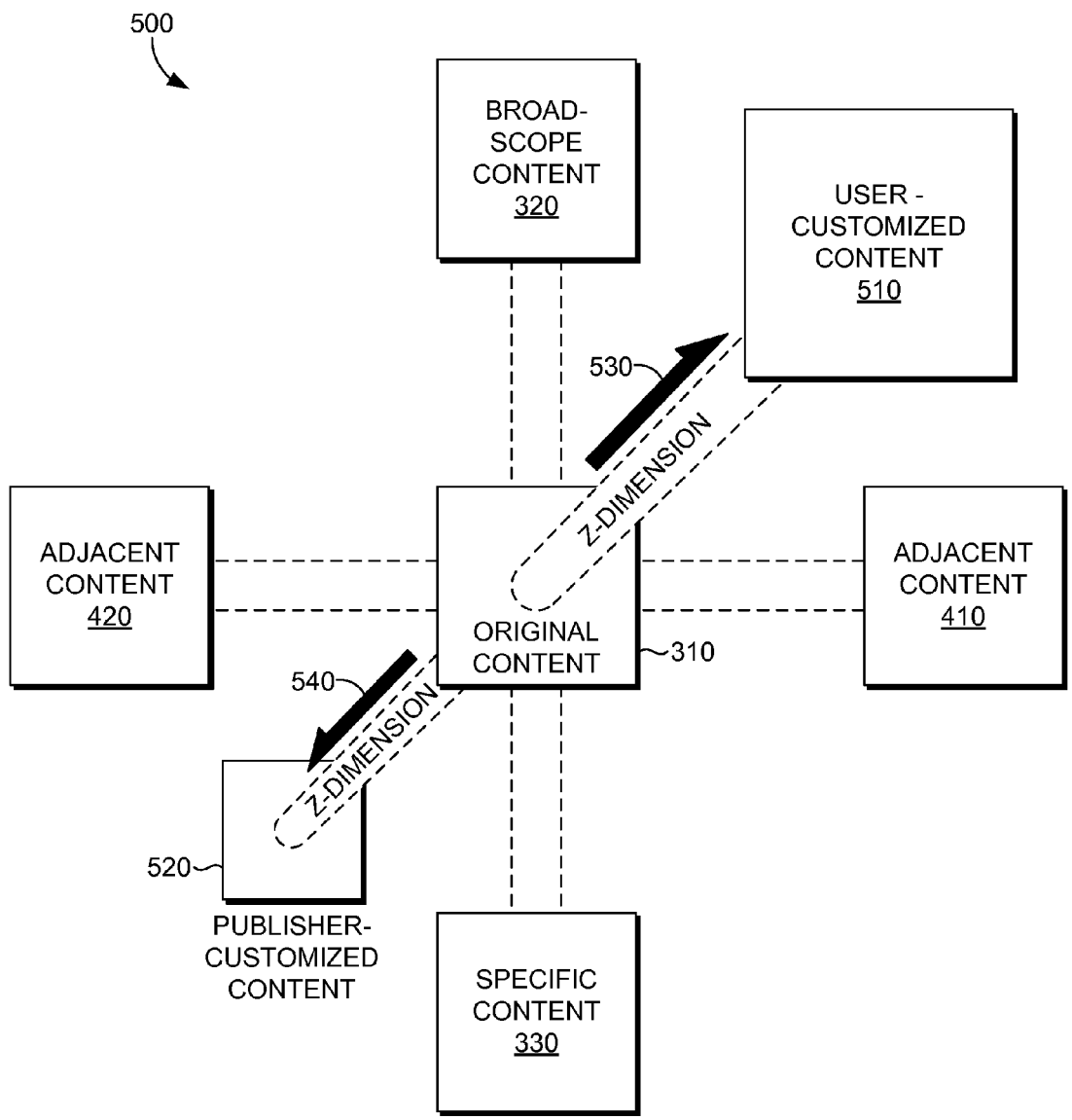
FIG. 5 is block diagram of exemplary transitions between a document and views of retrieved content within a z-dimension of the directed graph, in accordance with embodiments of the present invention.
Figure 6:
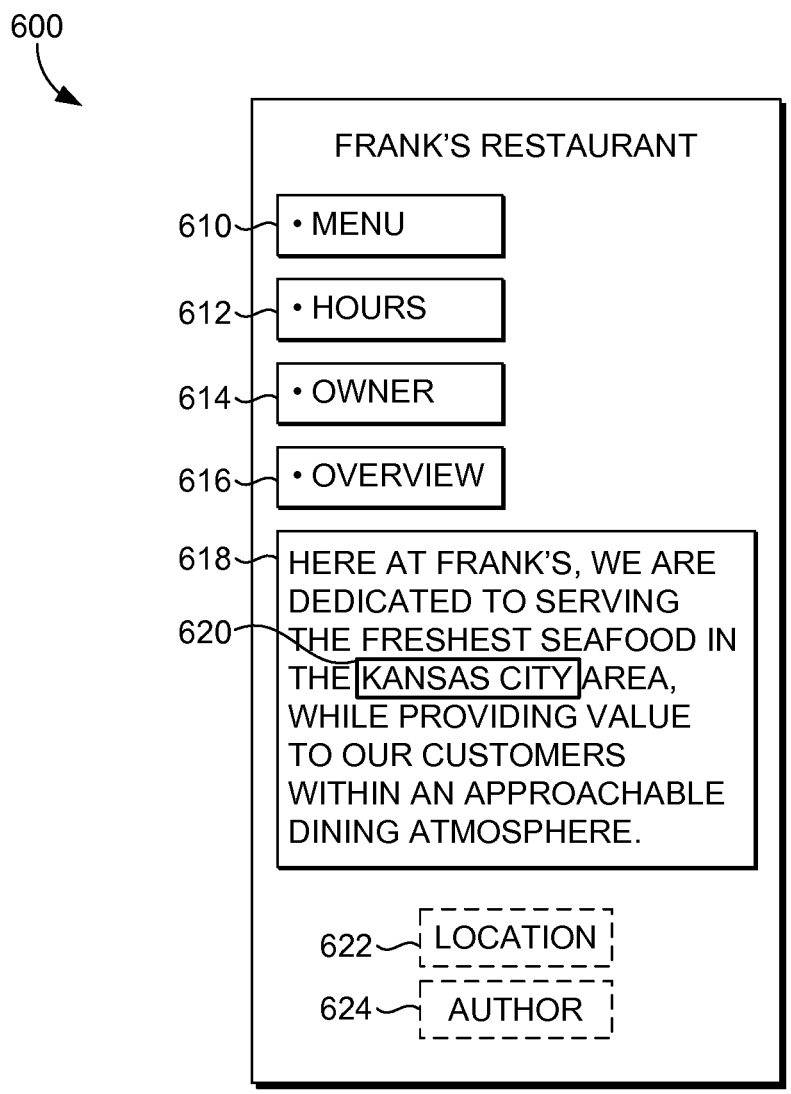
FIG. 6 is an illustrative user interface depicting an exemplary web-based document with differing types of content that is extractable therefrom, in accordance with an embodiment of the present invention.

The original content 310 within the document on FIG. 3 generally represents a starting point for the target of a user's operation. In FIG. 3, zoom operations will be discussed, but FIGS. 4 and 5 provide other examples of operations that trigger gathering content using the directed graph. It should be noted that the original content 310 may represent any form of content known in the art, such as an entire document, a page of a document, a paragraph, a word, a phrase, a string of alpha-numeric characters, a spreadsheet, a message, an email, or a well-structured entity (e.g., restaurant, product, or another consumer-centric item). The original content 310 may be gleaned from a document via structured characteristics, unstructured characteristics, or both. With reference to FIG. 6, showing a document 600 (e.g., web page of a restaurant), the distinction between structured and unstructured characteristics is illustrated, for demonstration purposes only. Generally, structured characteristics represent context of the document 600 and other data that is well-defined (e.g., author 624, location 622, and the like). These structured characteristics may be appended to the document 600 in the form of metadata and may be used to establish semantic connections within the directed graph to link to other documents that have similar, related, or relevant content therein. In embodiments, the structured characteristics of the document are well defined by an author of the document 600 or an administrator of a system that has access to the document 600.

Documents may also have unstructured characteristics. These unstructured characteristics may represent content that is extracted from a document. For instance, the extractable content from the document 600 may include text 620, a menu 610 (e.g., including a listing of entrees or other things served in a restaurant), an overview of the hours of operation 612, a biography of the owner 614, and an overview of the restaurant 616. These unstructured characteristics of the document 600 may be inferred in real time or may be preestablished when crawling a website. Further, these unstructured characteristics may form nodes within a directed graph that connect to other nodes (e.g., content of structured and/or unstructured characteristics of documents) within the directed graph. For example, with reference to the document 600, a zoom-in operation on the term "menu" within a search for a restaurant in the same location 622 as Frank's Restaurant may surface content behind the menu 610. In contrast, a zoom-out operation for an item on the menu 610 may generate other related content for the location 622, such as a map of the general vicinity, a review that mentions the menu item, and competing restaurants that serve the menu item, as the user is showing s/he cares about the concept of the menu item more than other things on the page based on the zoom-out operation.

Returning to FIG. 3, zooming operations of the semantic zoom-based functionality will be discussed. Generally, the zooming operations 340 and 350 trigger actions along a y-dimension. These zooming actions may represent new or current semantic gestures applied on a touch-screen display that manipulate a portion of the original content 310 being revealed. These semantic gestures may involve an open-pinch gesture for the zoom-out operation 340 and a close-pinch gesture for the zoom-in operation 350. It should be noted that the gestures represent a physical act or motion, undertaken by the user using an input (e.g., finger, fingers, pen/stylus, mouse, and the like) applied to a touch-screen display that serves to manipulate the UI. Generally, the UI manipulation is a substantially immediate response to the gesture(s) or other interactions. Although the semantic gestures discussed herein represent exemplary touch-optimized techniques for navigating content, the system may reassign zooming actions to the semantic gestures based on a context of the client device, or a user profile.

In one example, where the original content 310 represents a link to a web page, performing a zoom-in operation 350 that focuses on the link (e.g., within search results of a SERP) causes the web page to open or causes more results that are relevant to content on the web page to be shown. Performing the zoom-out operation 340 from a web page either may navigate back to an original SERP that listed the web page or generates a modified SERP that includes results that correspond to attributes of the web page. In another example, where the original content 310 represents a word of a document, performing the zoom-in operation 350 that focuses on the word causes information about the entities associated with the word become visible.

As illustrated, the zoom-in operation 350 (directional on the y-dimension), typically provides a vertical immersion that is targeted on a concept or portion of original content 310 within a page of a document. In one example, a zoom-in operation 350 targeted on a review of a restaurant retrieves other reviews by the person/source or for the same restaurant from other people/sources. In another example, the zoom-in operation 350 on a location within a web page retrieves a map with the location flagged. In these instances, the map and the reviews are examples of the specific content 330.

On the other hand, the zoom-out operation 340 (directional on the y-dimension), typically provides a context that is targeted on a concept or portion of original content 310 within a page of a document, or the entire page itself. Thus, the zoom-out operation 340 may transition from a page of the original content 310 to a generalized view showing the broad-scope content 320 that provides context about the page or original content 310, as opposed to simply contracting the original content 310 within a display area. For example, when the original content 310 represents search results within a SERP, the broad-scope content may represent other queries related to an initial query that generated the search results. Or, in the same example, the zoom-out operation 340 may render images of the initial query or news for the initial query. In another example, the zoom-out operation 340 is triggered upon the user zooming out with a conventional operation that expands a SERP to beyond a full screen within a display area and, at that point, invoking the semantic zoom-based functionality to provide results relevant to the SERP (e.g., results that provide context to content of the document).

It should be noted that, although various examples are provided for the zooming operations 340 and 350, there may be consistency implemented within the semantic zoom-based functionality, such that the results retrieved from a particular type of document with a particular type of zoom operation predictability are similar (e.g., similar type of format with a similar type of content populated within the format). For instance, when viewing a web page that was accessed by selecting a link associated with a search result in a SERP, the action of going backward to the SERP may be consistently triggered by a close-pinch gesture, while the action of expanding an amount of specific content 330 for a particular passage within the original content 310 may be consistently triggered by an open-pinch gesture.

Turning to FIG. 4, a block diagram showing exemplary transitions 400 between a document and views of retrieved content within an x-dimension of the directed graph is provided, in accordance with embodiments of the present invention. As illustrated, operations 430 and 440 are applied to the original content 310 to retrieve adjacent content 410 and 420, respectively. Typically, the gestures associated with the operations 430 and 440 are distinct from the gestures (e.g., open-pinch and close-pinch on a touch-screen device) employed for the semantic zoom-based functionality (e.g., zooming operations 340 and 350 of FIG. 3). In one instance, the operations 430 and 440 represent panning operations, such as a left- or right-swipe gesture over a portion of the original content 310 within a touch-screen display. These panning operations may retrieve the adjacent content 410 and 420, which may include information related to a type of document holding the original content 310. Accordingly, for example, upon a user performing a pan-forward operation 430, adjacent content 410 that reveals to the user other entities of a similar type to entities of the original content 310 within the adjacent space (e.g., next logical restaurant based upon some criteria or next logical restaurant review based upon some criteria). In another example, upon a user performing a pan-backward operation 440, adjacent content 420 that reveals to the user other information of a similar type to the information of the original content 310 within the adjacent space (e.g., another web page hosting equivalent types of content as a current page or another restaurant located close to the restaurant being currently viewed). Thus, the operations 430 and 440 act to retrieve additional related content via horizontal exploration within the directed graph, as opposed to showing more original content 310 of the same document (e.g., turning pages of an online book).

Moving to FIG. 5, a block diagram is shown of exemplary transitions 500 between a document and views of retrieved content within a z-dimension of the directed graph, in accordance with embodiments of the present invention. As illustrated, operations 530 and 540 are applied to the original content 310 to retrieve some type of customizable content 510 and 520, respectively. Typically, the gestures associated with the operations 530 and 540 are distinct from the gestures (e.g., open-pinch and closed-pinch on a touch-screen device) employed for the semantic zoom-based functionality (e.g., zooming operations 340 and 350 of FIG. 3) and from the gestures (e.g., right-swipe and left swipe on a touch-screen display) employed for x-dimensional operations (panning operations 430 and 440 of FIG. 4). In one instance, the operations 530 and 540 represent rotational operations, such as a left- or right-twist gesture over a portion of the original content 310 within a touch-screen display. These rotational operations may retrieve the customized content 510 and 520, which may include information related to a type of document holding the original content 310. Accordingly, for example, upon a user performing a first rotational operation 530 (e.g., right-twist gesture), user-customizable content 510 may be revealed. In one embodiment, the user-customizable content 510 being attained involves a set of data related to predefined user preferences (e.g., type of content favored by the user or format of a view favored by the user). In another example, upon a user performing a first rotational operation 540 (e.g., left-twist gesture), publisher-customizable content 520 may be revealed. In one embodiment, the publisher-customizable content 520 being attained involves a set of data related to predefined publisher preferences (e.g., type of content favored by the publisher or format of a view favored by the publisher).

It should be appreciated and understood that the pairing of gestures and resultant content that is retrieved via the multi-dimensional semantic connections of the directed graph are described for demonstrative purposes only. For instance, different gestures than those described may be implemented to invoke the semantic zoom-based functionality. Further, some operations may be activated under certain conditions and deactivated under other conditions (e.g., see discussion related to FIG. 9). Further, although at times described as a set of operations that compose a standardized scheme for navigating between content (i.e., providing an intuitive search experience for the user), it should be noted that the formats of views and the type of content being populated into the views may vary based on other factors beyond the type of document and/or the type of content. Accordingly, in the search experience of embodiments of the present invention, a UI will accept and interpret various inputs, or combinations of inputs, to enhance the user's online experience.

Figure 7:
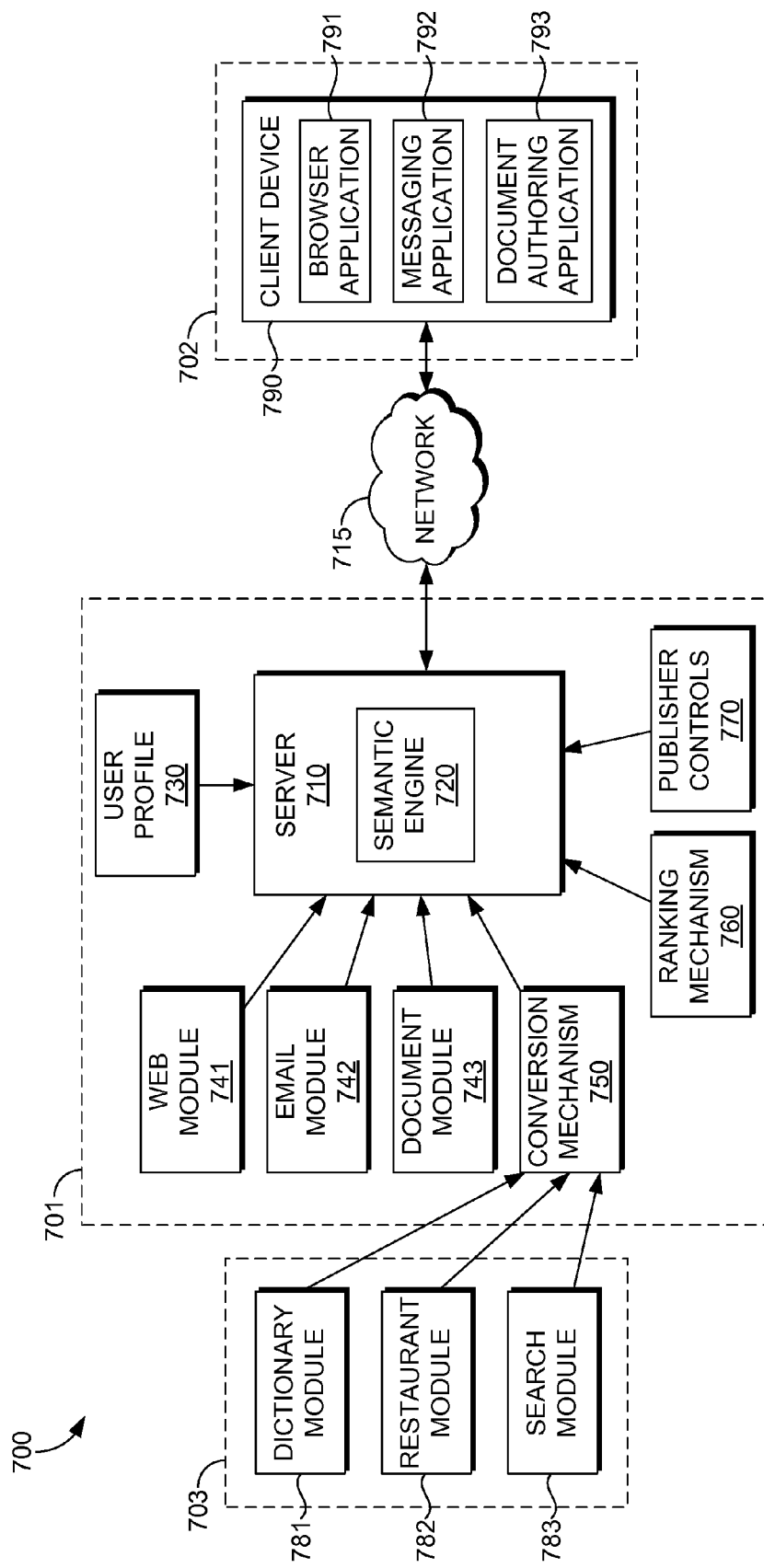
FIG. 7 is a graphical representation illustrating an exemplary system architecture for implementing semantic zoom-based functionality using a web browser, a semantic engine, or a combination thereof, in accordance with embodiments of the present invention.

Turning to FIG. 7, a graphical representation illustrating an exemplary system architecture 700 for implementing semantic zoom-based functionality using a browser application 791, a semantic engine 720, or a combination thereof is shown, in accordance with embodiments of the present invention. Initially, the environment of FIG. 7 may be a distributed computing system suitable for use in implementing embodiments of the present invention. The exemplary system architecture 700 includes a client device 790 that has an operating system running thereon, a server 710, and a network 715 that interconnects each of these items. Each of the client device 790 and the server 710 shown in FIG. 7, may take the form of various types of computing devices, such as, for example, the computing device 100 described above with reference to FIG. 1. By way of example only and not limitation, the client device 790 and/or the server 710 may be a personal computer, desktop computer, laptop computer, consumer electronic device, handheld device (e.g., personal digital assistant), various servers, processing equipment, and the like. It should be noted, however, that the invention is not limited to implementation on such computing devices but may be implemented on any of a variety of different types of computing devices within the scope of embodiments of the present invention.

Typically, the client device 790 includes, or is linked to, some form of computing unit (e.g., central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the client device 790 to enable the device to perform communication-related processes and other operations. In another instance, the computing unit may encompass a processor (not shown) coupled to the computer-readable medium accommodated by the client device 790.

Generally, the computer-readable medium includes physical memory that stores, at least temporarily, a plurality of computer software components that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

Also, beyond processing instructions, the processor may transfer information to and from other resources that are integral to, or disposed on, the client device 790. Generally, resources refer to the operating system, software components (e.g., applications 791-3), or other mechanisms that enable the client device 790 or the server 710 to perform a particular function. By way of example only, resource(s) accommodated by a server 710 operate to assist the semantic engine 720 in receiving inputs from a user at the client device 790 and/or providing an appropriate communication (e.g., content or results) in response to the inputs.

The client device 790 may include an input device (not shown) and a presentation device for presenting user interfaces (UIs) of FIG. 6. Generally, the input device is provided to receive input(s) affecting, among other things, original content 310 of FIG. 3 of a document being composed or manipulated by the messaging application 792 or the document-authoring application 793. Illustrative input devices include a mouse, joystick, key pad, microphone, I/O components 120 of FIG. 1, or any other component capable of receiving a user input and communicating an indication of that input to the client device 790. By way of example only, the input device facilitates entry of a portion of original content of a document, which is communicated over the network 715 by the browser application 791, for processing by the semantic engine 720.

In embodiments, the presentation device of the client device 790 is configured to render and/or present the content of the documents and, at time, the views of content (e.g., specific content, broad-scope content, or original content) within a search window rendered by the browser application 791. The search window is configured to include a list of the search results, online content, or other information relevant to the original content with a directed graph.

The presentation device, which is operably coupled to an output of the client device 790, may be configured as any presentation component that is capable of presenting information to a user, such as a digital monitor, electronic display panel, touch-screen, analog set-top box, plasma screen, audio speakers, Braille pad, and the like. In one exemplary embodiment, the presentation device is configured to present rich content, such as digital images and videos. In another exemplary embodiment, the presentation device is capable of rendering other forms of media (i.e., audio signals).

The devices 790 and 710 of the exemplary system architecture 700 may be interconnected by any method known in the relevant field. For instance, the client device 790 and the server 710 may be operably coupled via a distributed computing environment that includes multiple computing devices coupled with one another via one or more networks (e.g., network 715). In embodiments, the network may include, without limitation, one or more local area networks (LANs) and/or wide area networks (WANs). Such networking environments are commonplace in offices, enterprise-wide computer networks, intranets, and the Internet. Accordingly, the network is not further described herein.

A discussion of the computer software components exemplary system architecture will now commence. Initially, the components are divided into various groupings: a service-side system 701, a user-side system 702, and a third-party-side system 703. These groupings help demonstrate the parties that may exert control over the configuration and/or operation of certain components bounded within the groupings. For instance, a user may have control of inputs (e.g., touch-screen gestures) being provided to any of the applications 791-793, while a system administrator of an online service may have rights to program the semantic engine 720 or any of the modules 741-743. A third-party (e.g., vendor, content publisher, or advertising agent) may have control of how one or more of the modules 781-783 are managed. Yet, these grouping are exemplary and shown for understanding of embodiments of the present invention. For instance, a user may have control over entries within the user-profile 730 within the service-side system 701, while a publisher of a website may be able to modify attributes of the publisher controls 770 within the service-side system 701.

In operation, the semantic engine 720 runs on one or more of the servers 710 and calls on various sources (e.g., modules 741-743 and mechanisms 750 and 760) for input in response to a search operation (e.g., zoom, panning, rotational operations, or other user-experience controls) entered at the browser application 791. The browser application 791 may accept the search operations via any of the input devices described above (e.g., touch-screen display). These input devices and/or presentation devices provided on the client device 790 may assist in exposing the search operations that a user may carry out within a particular application (e.g., applications 791-793).

The modules 781-783 within the third-party-side system 703 are generally designed to provide content to the semantic engine 720. These modules 781-783 may be registered as a provider for a certain type of content (e.g., addresses, words, paragraphs, people, places) or for particular categories (e.g., travel, dining, or sport). In operation, any time a call for a certain type of content is made from the semantic engine 720, one or more of the modules 781-783 may be called for sought-after content. For instance, the dictionary module 781 may be called for a definition of a word that is a target of a zoom-in operation. In another instance, the restaurant module 782 may be called for map or review when a name of a particular restaurant is the target of a zoom-in operation. In yet another instance, the search module 783 may be called for a set of related search results/queries when a zoom-out operation is performed on a SERP. Although a few examples of modules within the system 703 are provided, many more are contemplated by the embodiments of the present invention. For instance, a weather module may be called when a city is a target of some operation, while a Skype module may be called when an address or phone number of a person is the target of another operation.

The owners of the modules 781-783 may pay a price (e.g., bidding auction) for the opportunity to provide content. Further, owners of the modules 781-783 may register as a provider for any string that is the target of a search operation in order to provide content to the user. For instance, a movie-based module may register to show a number of Grammy Awards a person has won upon detecting a zoom-in operation upon a name of a movie star within some original content. Thus, the architecture 700 allows for monetizing the semantic zoom-based functionality.

Further, the modules 781-783 and 741-743 may be dynamically managed by the server-side system 701 (e.g., using bidding to monetize) or statically selected by the user (e.g., through configuration settings). These modules 781-783 and 741-743 may be installed manually, either remotely or locally, by the user. Downloading may occur similar to apps, where a platform is provided that allows users to select the modules 781-783 and 741-743 from a listing (e.g., ordered by cost, popularity, and the like). Once downloaded and installed, the modules 781-783 and 741-743 may include a mechanism that plugs their functionality into the proper semantic space/category for automatic use when the user is conducting search operations.

The conversion mechanism 750 is generally configured for determining a format of view based on, in part, a type of the at least one zoom operation and for organizing a new set of content in accordance within the format. For instance, the conversion mechanism 750 may receive unformatted content from one or more of the third-party modules 781-783 and convert it into a predefined format that corresponds with some criteria (e.g., type of data, type of search operation, or type of document). The ranking mechanism 760 is generally configured for filtering content retrieved from one or more of the third-party modules 781-783 to a new set of content and for ordering the new set of content based on, in part, relevance to the original content. For example, if there is more content retrieved than real estate within a display area of a given level of zoon, the retrieved content is sorted by priority, preferences, or other controls (e.g., monetization controls of the semantic engine 720) within the system architecture 700.

The semantic engine 720 is generally configured for detecting at least one zoom operation directed to a portion of original content within the document and for transitioning from the document to a view that includes a new set of content that is linked to the original content via tendrils (e.g., semantic connections) in a predefined directed graph. As mentioned above, the directed graph is constructed of a multi-dimensional lattice of semantic connections between nodes, where the nodes include the original content and the new set of content.

The semantic engine 720 may be coupled to certain components (e.g., user profile 730 and publisher controls) that include configuration settings. These configuration setting may affect the type and arrangement of content that is displayed upon conducting a search operation, where the type and arrangement be user-based (e.g., using the user profile 730), publisher-based (e.g., using the publisher controls), and/or system default (e.g., using the modules 741-743). In embodiments, these configuration settings may modify the context in which the semantic zoom-based functionality is carried out. Logic may be implemented to meter how much control over the type of content that is imported into the results is allocated to a user, a publisher, and a browser/engine.

In one instance, the configuration settings might dictate a type of search results that are rendered upon completing a zoom operation. For example, if the user likes Wikipedia, the user may alter a setting within the user-profile 730 that generates definitions from Wikipedia upon performing a zoom-in operation into a web page. In another instance, the user's configuration settings may require that social-media commentary, popular documents, or common queries related to the document and/or results be included within the results. In yet another instance, the user's configuration settings may encompass entities (e.g., people, places, topics, and events) that are pinned to the browser application 791, such that the results are filtered based on the pinned entities. In still another instance, the user's configuration settings may be used to prioritize or organize the results.

Configuration settings may further allow for the extensibility of the search operations described above. That is, configuration setting allow others to participate in the framework the directed graph, thereby influencing semantic connections between certain content. For instance, Merriam Webster may offer to pay for semantic connections to their definitions within the dictionary module 781 when a word within a document is the focus of a zoom-in operation. In another instance, via the publisher controls 770, a publisher of the website or owner of an online document may influence what type of content is provided to a user upon the user conducting one or more search operations upon the website or online document. Thus, the configuration settings allow for not only users and publishers to influence the type and/or format of content returned in response to a search operation, but for third parties to contribute to content when responding to a search operation.

Further, content providers may implement semantic zoom-based functionality locally without the help of the semantic engine 720 and/or the browser application 791. Thus, this functionality may run using a standard search engine. For instance, the restaurant-review site Yelp may specify the type of content that appears within a display area the user conducts zoom operations upon a web page within the website of Yelp.

This distributed computing environment of FIG. 7 is but one example of a suitable environment that may be implemented to carry out aspects of the present invention and is not intended to suggest any limitation as to the scope of use or functionality of the invention. Neither should the illustrated exemplary system architecture 700 be interpreted as having any dependency nor requirement relating to any one or combination of the devices 790 or 710, or the components 720, 730, 741-743, 750, 760, 770, 781-783, and 791-793 as illustrated. In other embodiments, one or more of the components 720, 730, 741-743, 750, 760, 770, 781-783, and 791-793 may be integrated directly into the client device 790 or on distributed nodes that interconnect to form the server 710.

Accordingly, any number of components may be employed to achieve the desired functionality within the scope of embodiments of the present invention. Although the various components 720, 730, 741-743, 750, 760, 770, 781-783, and 791-793 of FIG. 7 are shown with lines for the sake of clarity, in reality, delineating various components is not so clear, and, metaphorically, the lines would more accurately be grey or fuzzy. Further, although some components of FIG. 7 are depicted as single blocks, the depictions are exemplary in nature and in number and are not to be construed as limiting (e.g., although only one semantic engine 720 is shown, many more may be communicatively coupled to the client device 790).

Figure 8:
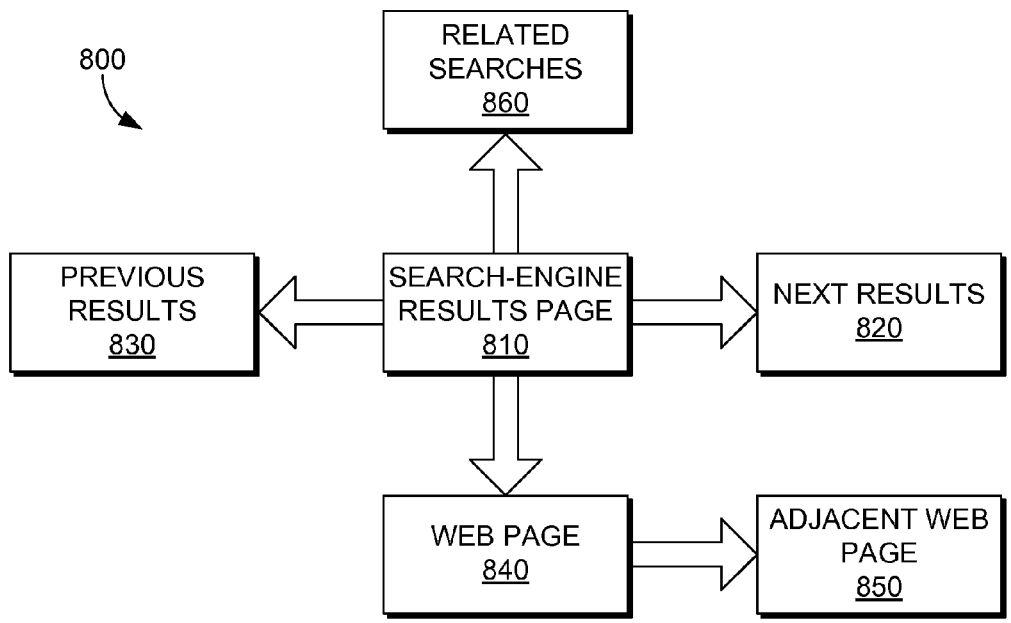
FIG. 8 is a diagrammatic progression showing exemplary transitions between an online document and views that are generated via the semantic zoom-based functionality, in accordance with embodiments of the present invention.

Turning to FIG. 8, a diagrammatic progression 800 showing exemplary transitions between an online document and views that are generated via the semantic zoom-based functionality is provided, in accordance with embodiments of the present invention. As illustrated, a zoom-in operation (e.g., open-pinch gesture) performed on a search result of a SERP 810 may transition to a focused view of a web page 840 (i.e., specific content) that is relevant to the search result. A zoom-out operation (e.g., close-pinch gesture) performed on a search result of the SERP 810 may transition to a generalized view of related searches (i.e., broad-based content) that are relevant the initial search that rendered the search results.

In embodiments, a panning operation (e.g., right-swipe gesture) performed on a search result of the SERP 810 may transition to an adjacent view of a next set of results 820 from the initial search query. A panning operation (e.g., left-swipe gesture) performed on a search result of the SERP 810 may transition to an adjacent view of a previous set of results 830 from the initial search query. Thus, in the condition of a web-page-type document, each of the zoom and panning actions are active to retrieve relevant content via the directed graph.

Figure 9:
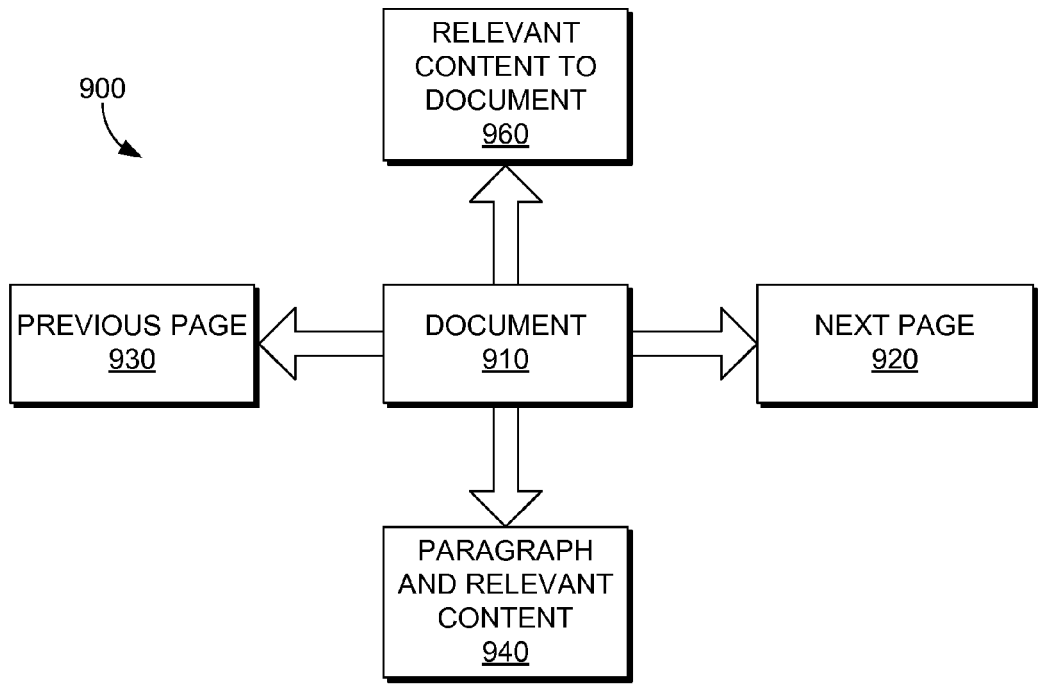
FIG. 9 is a diagrammatic progression showing exemplary transitions between an offline document and views that are generated via the semantic zoom-based functionality, in accordance with embodiments of the present invention.

Turning to FIG. 9, a diagrammatic progression 900 showing exemplary transitions between an offline document and views that are generated the semantic zoom-based functionality is provided, in accordance with embodiments of the present invention. As illustrated, a zoom-in operation (e.g., open-pinch gesture) performed on original content (e.g., a paragraph on a page) of the document 910 may transition to a focused view of the paragraph along with new content 904 relevant to the paragraph (i.e., specific content). A zoom-out operation (e.g., close-pinch gesture) performed on the original content of the document 910 may transition to a generalized view of content that is relevant to an entirety of the document 960 (i.e., broad-based content) or a current page of the document 910. In embodiments, a panning operation (e.g., right-swipe gesture) performed on a page of the document 910 may transition to a next page 920 of the document, while a panning operation (e.g., left-swipe gesture) performed on the page of the document 910 may transition to a previous page of the document 930. Thus, in the condition of an offline document or a piece of multi-page literature (e.g., book, article, or newspaper), the zoom actions are active to retrieve relevant content via the directed graph, while the panning actions are inactive and trigger the standard actions that are provided as defaults.

Exemplary methods for performing a gesture-based search are described with reference to FIGS. 8 and 9. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network or a communication cloud. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual operations may be omitted from the methods without departing from the spirit and scope of the subject matter described herein. In the context of software, the blocks represent computer instructions that, when executed by one or more processors, perform the recited operations.

Figure 10:
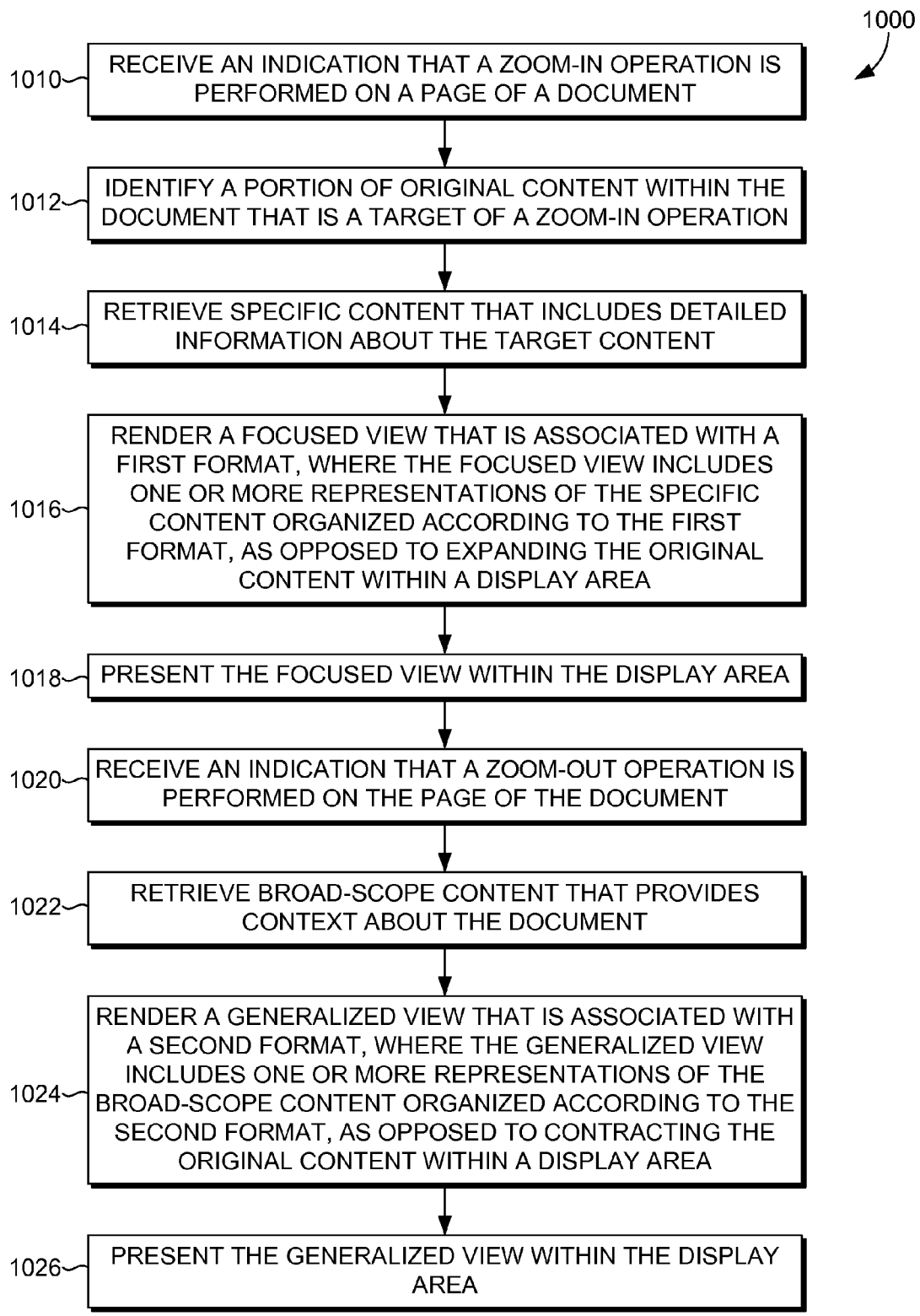
FIG. 10 is a flow diagram showing an overall method for semantically navigating between content using zoom operations, in accordance with an embodiment of the present invention.

Turning to FIG. 10, is a flow diagram is illustrated showing an overall method 1000 for semantically navigating between content using zoom operations, in accordance with an embodiment of the present invention. In embodiments, the steps of the method 1000 involve receiving an indication that a zoom-in operation is performed on a page of a document. As indicated at block 1010. In one instance, the zoom-in operation represents an open-pinch gesture carried out on a touch-screen display of a client device.

In response to the zoom-in operation, a portion of original content within the document that is a target of the zoom-in operation is identified (see block 1012) and specific content that includes detailed information about the target content is retrieved (see block 1014). Upon retrieving the specific content, a focused view that is associated with a first format is rendered, as indicated at block 1016 Typically, the focused view includes one or more representations of the specific content organized according to the first format, as opposed to expanding the original content within a display area. The focused view may be presented within the display area of a client device, thereby allowing the user to review the specific content, as indicated at block 1018. At times, the method 1000 further comprises displaying visual cues to indicate a transition between the original content of the document and the specific content of the focused view.

The steps of the method 1000 may further include receiving an indication that a zoom-out operation is performed on the page of the document, as indicated at block 1020 In one instance, the zoom-out operation represents an close-pinch gesture carried out on a touch-screen display of a client device. In response to the zoom-out operation, broad-scope content that provides context about the document is retrieved (see block 1022) and a generalized view that is associated with a second format is rendered (see block 1024). Typically, the generalized view includes one or more representations of the broad-scope content organized according to the second format, as opposed to contracting the original content within a display area. The generalized view may be presented within the display area of the client device, thereby allowing the user to review the broad-scope content, as indicated at block 1026. At times, the method 1000 further comprises displaying visual cues to indicate a transition between the original content of the document and the broad-scope content of the general view. It should be noted that the first format and the second format may be governed by a type of the document and/or a type of zoom operation performed on the document.

Figure 11:
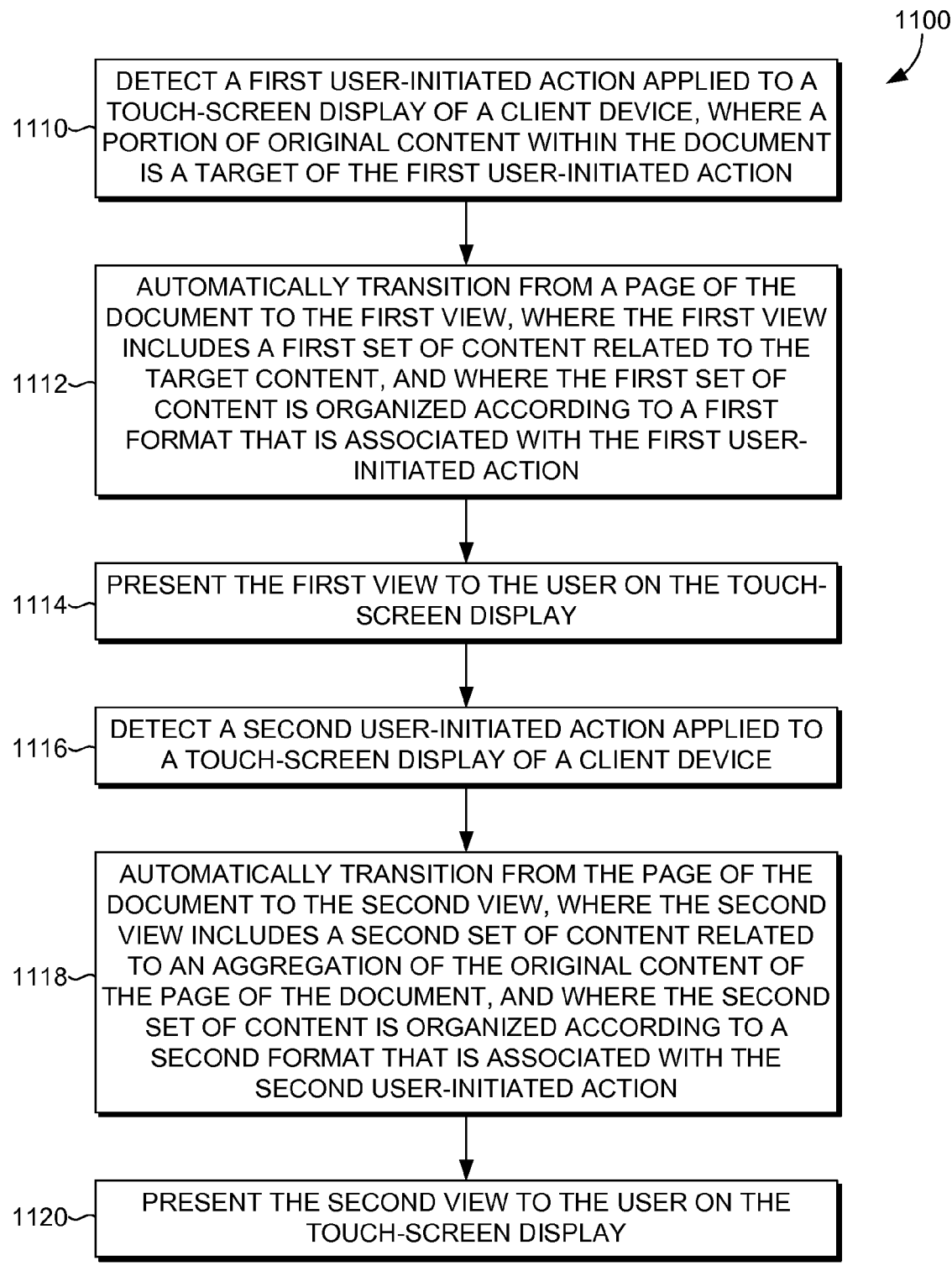
FIG. 11 is a flow diagram showing an overall method transitioning a page of a document to a first view or a second view in accordance with semantic zoom-based functionality, in accordance with an embodiment of the present invention.

Turning now to FIG. 11, a flow diagram is illustrated showing an overall method 1100 for transitioning a page of a document to a first view or a second view in accordance with semantic zoom-based functionality, in accordance with an embodiment of the present invention. In embodiments, the method 1100 involves a step of detecting a first user-initiated action applied to a touch-screen display of a client device, as indicated at block 1110 Typically, a portion of original content within the document is a target of the first user-initiated operation. Upon detecting the first user-initiated operation, the page of the document is automatically transitioned to the first view, as indicated at block 1112. Typically, the first view includes a first set of content related to the target content, where the first set of content is organized according to a first format that is associated with the first user-initiated operation. In embodiments, a type of content of the first set of content is specified by configuration settings controlled by a user of the client device or a publisher of the document. The first view may be presented to the user on the touch-screen display, as indicated at block 1114.

In another embodiment, the method 1100 may include detecting a second user-initiated operation applied to a touch-screen display of a client device, as indicated at block 1116. In response to the second user-initiated operation, the page of the document is automatically transitioned to the second view, as indicated at block 1118. Typically, the second view includes a second set of content related to an aggregation of the original content of the page of the document, where the second set of content is organized according to a second format that is associated with the second user-initiated operation. In embodiments, a type of content of the second set of content is specified by the configuration settings. The second view may presented to the user on the touch-screen display, as indicated at block 1120.

The user-initiated operations may be any type of action, such as a gesture physically performed by a user upon a touch-screen display of a client device (e.g., tablet computer). In one example, the first user-initiated operation represents a open-pinch gesture and the second user-initiated operation represents a close-pinch gesture. In another example, the first user-initiated operation represents a pan-forward gesture and the second user-initiated operation represents a pan-backward gesture. In still another example, first user-initiated operation represents a right-twist gesture and the second user-initiated operation represents a left-twist gesture.

In some embodiments, detecting the user-initiated search operations upon the portion of the original content within a document, as mentioned above, involves recognizing an entity-selection action that is directed to a word or phrase within the original content. As used herein, the phrase "entity-selection action" is meant to represent any action, command, or indication that may be interpreted as targeting, focusing on, or being directed to a portion of the document being view, composed, or manipulated. By way of example only, the entity-selection action may comprise highlighting a word or phrase and actuating a search operation while a word or phrase is set off within the original content.

Further, the type of content that may be injected into the document using the search operations may vary broadly. For example, the online content may include the text within the selected search result(s) themselves or metadata describing the selected search result(s).

Any of the acts of any of the methods described herein may be implemented at least partially by a processor or other electronic device based on instructions stored on one or more computer-readable media.

Although the invention has been described in language specific to structural features and/or methodological acts, it is to be understood that the invention is not necessarily limited to the specific features or acts described. Rather, the specific features and acts are disclosed as exemplary forms of implementing the invention.

The invention claimed is:

1. A computer system for navigating between semantically-related content in response to zoom operations within a document, the computer system comprising a processing unit coupled to a computer storage medium, the computer storage medium having stored thereon computer-executable instructions that, when executed by the processing unit, implement a method, the method comprising:
   detecting at least one zoom operation directed to a portion of original content within the document and transitioning from the document to a view that includes a new set of content that is linked to the original content via tendrils in a predefined directed graph, wherein the directed graph is constructed of a multi-dimensional lattice of semantic connections between nodes, wherein the nodes include the original content and the new set of content;
   filtering content retrieved from one or more vendor modules to the new set of content and ordering the new set of content based on, in part, relevance to the original content;
   determining a format of the view based on, in part, a type of the at least one zoom operation and organizing the new set of content in accordance within the format; and
   providing the view for presentation at a display area.

2. The computer system of claim 1, wherein the type of the at least one zoom operation comprises at least one of a zoom-in operation, a zoom-out operation, a pan-forward operation, or a pan-backward operation.

3. The computer system of claim 2, wherein the zoom-in operation is associated with a focused view that includes specific content associated with the original content and the zoom-out operation is associated with a generalized view that includes broad-scope content associated with the original content.

4. The computer system of claim 2, wherein the pan-forward operation and the pan-backward operation cause a retrieval of adjacent content that includes information related to a type of the document, and wherein the adjacent content is populated in the view that is provided for presentation at the display area.

5. The computer system of claim 4, wherein the type of the document comprises at least one of a search-engine results page, an offline document, an online document, a word-processing document, or a composed message.

6. One or more computer storage media having computer-executable instructions embodied thereon that, when executed, perform a method comprising:
   receiving an indication of a zoom operation that is directed to target content;
   based on the indication of the zoom operation, transitioning to a view that includes new content, wherein the new content is linked to the target content via a connection in a directed graph comprising a multi-dimensional lattice of semantic connections, and wherein the new content includes third-party content that has been filtered and ranked based on relevance of the third-party content to the target content; and
   providing the view for presentation at a display area, wherein a format of the view is based on a type of the zoom operation and the new content is organized based on the format.

7. The media of claim 6, wherein the type of the zoom operation comprises at least one of a zoom-in operation, a zoom-out operation, a pan-forward operation, or a pan-backward operation.

8. The media of claim 7, wherein the zoom-in operation represents an open-pinch gesture carried out on a touch-screen display of a client device.

9. The media of claim 7, wherein the zoom-out operation represents a close-pinch gesture carried out on a touch-screen display of a client device.

10. The media of claim 7, wherein the zoom-in operation is associated with a focused view that includes specific content associated with the target content and the zoom-out operation is associated with a generalized view that includes broad-scope content associated with the target content.

11. The media of claim 10, wherein the new content is based on configuration settings, wherein the configuration settings are influenced by at least one of a user, a publisher of a document that includes the target content, or an administrator of a system that returns the specific content or the broad-scope content.

12. The media of claim 7, wherein the pan-forward operation and the pan-backward operation cause a retrieval of adjacent content that includes information related to a type of document that includes the target content, and wherein the adjacent content is populated in the view that is provided for presentation at the display area.

13. The media of claim 7, wherein a twist operation causes a retrieval of content that includes a predefined type of information that has been predefined by at least one of a user or a publisher, and wherein the content that includes the predefined type of information is populated in the view that is provided for presentation at the display area.

14. The media of claim 6, wherein the method further comprises displaying visual cues to indicate a transition between the target content and the view that includes the new content.

15. The media of claim 6, wherein the target content is included in a document at least one of a search-engine results page, an offline document, an online document, a word-processing document, or a composed message.

16. A computerized method comprising:
receiving an indication of a user-initiated operation that is directed to target content, the target content comprising a portion of original content included in a document;
based on the indication of the user-initiated operation, transitioning to a view that includes new content, wherein the new content is linked to the target content via a connection in a directed graph comprising a multi-dimensional lattice of semantic connections, and wherein the new content includes third-party content that has been filtered and ranked based on relevance of the third-party content to the target content; and
providing the view for presentation at a display area, wherein the view is associated with a format that is based on a type of the user-initiated operation and the new content is organized based on the format.

17. The computerized method of claim 16, wherein the user-initiated operation comprises at least one of a zoom-in operation, a zoom-out operation, a pan-forward operation, a pan-backward operation, a right-twist operation, or a left-twist operation.

18. The computerized method of claim 17, wherein the zoom-in operation is associated with a focused view that includes specific content associated with the target content and the zoom-out operation is associated with a generalized view that includes broad-scope content associated with the target content.

19. The computerized method of claim 18, wherein the target content comprises a link on a search-engine results page, and wherein the zoom-in operation causes a web page associated with the link to open.

20. The computerized method of claim 18, wherein the target content comprises a web page associated with a link on a search-engine results page, and wherein the zoom-out operation causes a modified search-engine results page to be generated, the modified search-engine results page comprising results that correspond to attributes of the web page.

* * * * *